United States Patent [19]

Williams

[11] 3,792,823

[45] Feb. 19, 1974

[54] TAPE CARTRIDGE AND PLAYBACK UNIT

[76] Inventor: Richard A. Williams, 7130 Fulton Ave., North Hollywood, Calif. 91605

[22] Filed: Sept. 20, 1967

[21] Appl. No.: 669,015

[52] U.S. Cl. ...... 242/55.19 A, 179/100.2 Z, 274/4 B

[51] Int. Cl. ........................ B65h 17/48, G11b 15/16

[58] Field of Search .... 242/199, 200, 197, 55.19 A, 242/55.19; 179/100.2 Z; 274/4 B

[56] References Cited

UNITED STATES PATENTS

| | | | |
|---|---|---|---|
| 2,867,389 | 1/1959 | Viets | 242/199 |
| 2,964,256 | 12/1960 | Gorey | 242/55.19 A |
| 3,025,012 | 3/1962 | Fries | 242/55.19 A |
| 3,161,362 | 12/1964 | Smith | 242/55.19 A |
| 3,227,508 | 1/1966 | Bavaro | 242/55.19 A UX |
| 3,243,134 | 3/1966 | Reed et al. | 242/55.19 A |
| 3,252,670 | 5/1966 | Smith | 242/55.19 A |
| 3,311,316 | 3/1967 | Williams | 242/55.19 A |
| 3,420,461 | 1/1969 | Cousino | 242/55.19 A |
| 3,437,762 | 4/1969 | Lear et al. | 242/55.19 A |

*Primary Examiner*—Billy S. Taylor
*Attorney, Agent, or Firm*—Smyth, Roston and Pavitt

[57] ABSTRACT

This invention relates to a magnetic tape cartridge system including a playback unit having dual capstans and a magnetic tape cartridge having openings positioned to receive the dual capstans during the replay of the magnetic tape cartridge by the playback unit. The dual capstans may be rotated in either of one of two opposite directions. The direction of rotation is controlled by the insertion of the magnetic tape cartridge into the playback unit and the direction of rotation is in accordance with the orientation of the magnetic tape cartridge. When the magnetic tape cartridge is inserted in the first orientation, the capstans are rotated in the first direction to replay one half the information on the tape. When the cartridge is turned upside down to be in the second orientation the capstans are rotated in the second direction to replay the remaining information on the tape. The playback unit includes means for sensing the orientation of the tape cartridge in order to properly determine which direction to rotate the capstans. The invention also includes the use of a spring-loaded pinch roller and idler roller mounted at the opposite ends of a single leaf spring so as to absorb shock and vibration and reduce wow and flutter. In addition, the invention includes positioning means on the cartridge which cooperate with corresponding means on the playback unit so as to enable the playback unit to replay cartridges of different sizes.

9 Claims, 8 Drawing Figures

INVENTOR:
Richard A. Williams

By Smyth, Roston & Pavitt

ATTORNEYS

INVENTOR:
Richard A. Williams
By Smyth, Roston & Pavitt
ATTORNEYS

Fig. 8 (Top Plate of Cartridge)
(Bottom Side Shown)

INVENTOR:
Richard A. Williams

By Smyth, Roston & Pavitt
ATTORNEYS

TAPE CARTRIDGE AND PLAYBACK UNIT

The present tape cartridges on the market, either four or eight-track, either use magnetic heads which include the same number of air gaps as the number of tracks on the magnetic tape cartridge and provide for switching between these air gaps, or must use a magnetic head which is movable in order to replay all the information on the magnetic tape cartridge. If the mangetic head contains as many air gaps as there are tracks on the magnetic tape cartridge and include switching means, this increases the cost of the playback unit. If the magnetic head is movable, this again increases the cost of the playback unit and, in addition, reduces the reliability since it is difficult to accurately position the magnetic head to replay all of the magnetic tracks.

Conventional reel-to-reel magnetic tape playback machines incorporate a much simpler system. The reel-to-reel magnetic tape playback machines use a magnetic head which is permanently fixed in position and contains half the number of air gaps as there are tracks on the tape. The air gaps on the magnetic head are offset so that when the magnetic tape is moved in a first direction relative to the magnetic head, the magnetic head replays half of the information on the magnetic tape. The reels are then turned over and the magnetic tape is moved in a second direction opposite to the first direction relative to the magnetic head so as to replay the other half of the information on the magnetic tape. It would be desirable to incorporate such a system with a magnetic tape cartridge so as to reduce the cost and simplify the operation of the playback unit while still maintaining a compatibility with existing magnetic tape cartridge systems.

The common type of magnetic tape cartridge uses a single endless belt construction which includes a loop of tape which passes across openings in the front face of the cartridge. The openings expose the magnetic tape so that the tape may be moved by an external capstan and the information recorded on the magnetic tape replayed by an external reproducing head. Some magnetic tape cartridges currently in use employ a pinch roller located permanently within the magnetic tape cartridge while others employ a pinch roller which is located within the planetary unit and which is rotated within the cartridge. The former system is referred to as an internal pinch roller system and the latter is referred to as an external pinch roller system. The present invention is described with reference to a cartridge which includes an internal pinch roller, but it is to be appreciated that the system of the present invention may be designed to operate with an externally provided pinch roller.

With the ordinary reel-to-reel magnetic tape playback machine the magnetic tape is moved in a first direction relative to the producing head until the payout reel is exhausted of magnetic tape. The reels are then turned over and switched and the magnetic tape is again moved relative to the reproducing head. Actually, the tape is being rewound on the original payout reel so that the tape is moving in a second direction relative to the magnetic reproducing head. The air gaps in the reproducing head are offset so that the reproducing head replays one-half of the information on the magnetic tape in one direction and the other half in the other direction.

The commonly used magnetic tape cartridge which includes the single reel endless belt as described above can only be moved in a single direction and the cartridge cannot be reversed. It would, therefore, be impossible to design a playback system which would reverse the direction of movement of the magnetic tape relative to the cartridge. The present invention includes a magnetic tape cartridge which operates in a single direction but is designed to be replayed in a playback unit including dual capstans. The magnetic tape cartridge of the present invention includes a plurality of openings in the front face of the cartridge to expose the magnetic tape. A central opening is designed to receive the reproducing head included in the playback unit and openings to either side of the central opening are designed to receive the dual capstans included in the playback unit.

One of the openings to either side of the central opening includes a flexibly mounted pinch roller. In particular, the present invention uses a pinch roller and an idler roller mounted at opposite ends of a single leaf spring. The flexible mounting of the pinch roller and idler roller absorbs shock and vibration and attenuates flutter and wow which may exist in the playback unit. In addition, the flexible mounting of the pinch roller and idler roller tends to equalize the tension in the magnetic tape thereby smoothing the operation during the replay of the cartridge. Finally, the flexible mounting of the pinch roller provides for a spring loading of the magnetic tape toward the capstan so as to insure good contact between the capstan and the magnetic tape and eliminating slippage during replay.

The playback unit includes dual capstans which may be driven off of a single motor. The playback unit includes means to sense the orientation of the magnetic tape cartridge within the playback unit so that the playback unit senses when the cartridge is inserted in the first orientation and senses when the cartridge is turned upside down and inserted in the second orientation. The means for sensing the orientation of the magnetic tape cartridge may be a spring-loaded switch means which is activated by a slot at the side of the magnetic tape cartridge.

When the magnetic tape cartridge is inserted into the playback unit, the spring-loaded switch means senses the orientation of the cartridge and the motor is controlled to rotate the capstans in a first direction. One of the capstans engages the internal pinch roller located within the cartridge and moves the magnetic tape in the proper direction within the cartridge. When the cartridge is turned over, the spring-loaded switch means again determines the orientation of the cartridge so as to control the motor to rotate the capstans in the opposite direction. Now the other of the capstans engages the internal pinch roller so that the magnetic tape is again moved in the same direction within the cartridge. Although the tape is always moved in the same direction within the cartridge, turning the cartridge over provides for the movement of the tape in opposite directions relative to the magnetic reproducing head. The magnetic reproducing head, therefore, may be designed to have half the number of air gaps as there are tracks on the tape and the magnetic reproducing head is permanently fixed in position so as to reproduce half of the information with the first orientation of the cartridge and the remaining half of the information with the second orientation of the cartridge.

In order that the magnetic tape cartridge equipment now on the market not be obsoleted by the cartridge and playback unit of applicant's invention, the playback unit of the present invention is designed so as to replay the information on existing tape cartridges and the cartridge of the present invention is designed so as to be replayed in an existing playback unit. Although applicant's magnetic tape cartridge is specifically designed to be replayed in either orientation, either right side up or upside down, it has been found that the magnetic tape cartridges currently on the market can also be played upside down, although not as well as applicant's cartridge. However, the cartridges currently on the market may be replayed in applicant's playback unit, so that a purchaser of the playback unit would not have to throw away all of his existing cartridges.

The slot in the cartridge of the present invention which cooperates with the spring-loaded switch means so as to determine the orientation of the cartridge is designed to be in the same position as the slot currently in use for the locking of an existing eight-track cartridge in a playback unit. Therefore, when the cartridge of the present invention is used in an existing playback unit, the slot is used for locking, and when the existing cartridges are used in applicant's playback unit, the slot is used to determine orientation. Since applicant uses the slot at the side of the cartridge to determine the orientation, the cartridge and playback unit of applicant's system include other means for locking the cartridge in place. In particular, applicant uses slots in the top and bottom walls of the cartridge of the present invention which cooperate with spring means in the playback unit so as to lock the cartridge in position. The slot in the bottom wall corresponds in position to an open area in the eight-track cartridges currently in use so that these eight-track cartridges can be replayed in applicant's playback unit and may be locked using the open area in the bottom wall. Applicant's cartridge, therefore, is fully compatible with the existing eight-track playback units and the existing eight-track cartridges may be replayed in applicant's playback unit. It is to be appreciated that the invention is disclosed with reference to an eight-track cartridge but that the invention may be made compatible with existing four-track cartridges.

Applicant's cartridge also includes rib members protruding from the top and bottom walls of the cartridge so as to position the magnetic cartridge of the present invention accurately as the cartridge is inserted into the playback unit. In addition, the rib members allow for the insertion of different size cartridges into the playback unit of the present invention. Therefore, the playback unit of the present invention can replay standard size cartridges or smaller cartridges.

A clearer understanding of a particular embodiment of the invention will be had with reference to the drawings wherein:

FIG. 8 is a detailed drawing of the top plate of the magnetic tape cartridge of the present invention.

Figure 1:
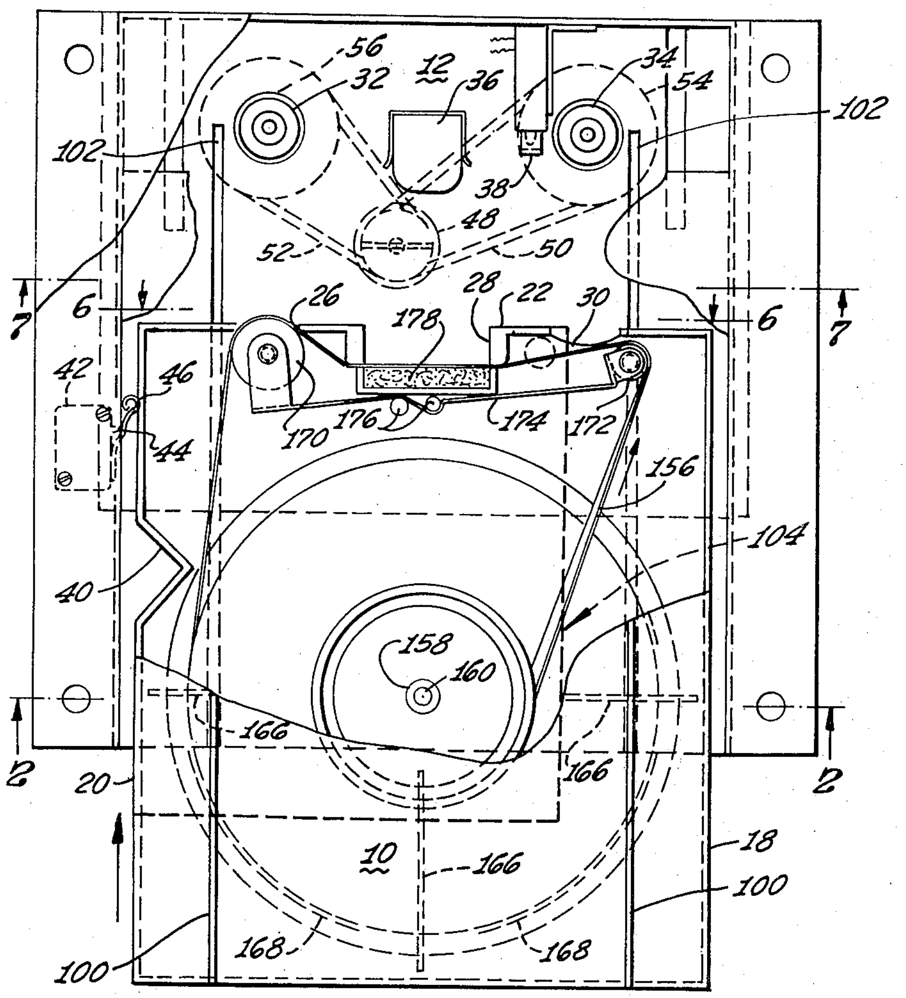
FIG. 1 illustrates a top view of a magnetic tape cartridge constructed in accordance with the teachings of the present invention and illustrating the insertion of the cartridge into a playback unit also constructed in accordance with the teachings of the present invention.
Figure 2:
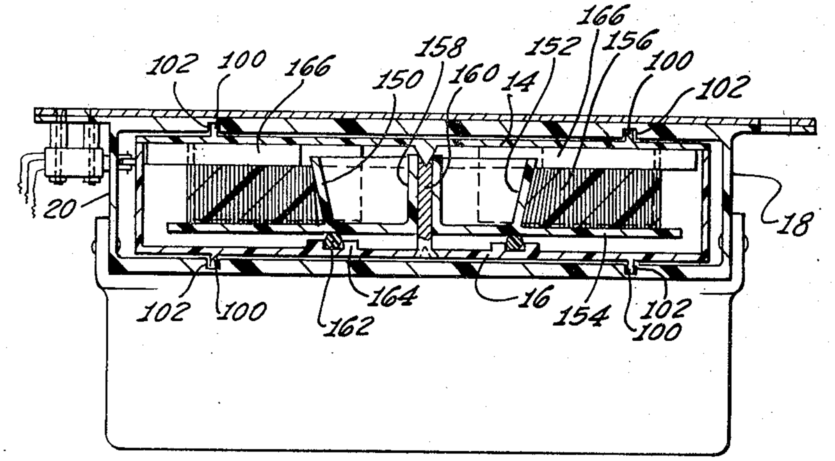
FIG. 2 is a cross-sectional view of the magnetic tape cartridge and playback unit of FIG. 1 taken along line 2—2 of FIG. 1.

In FIG. 1, a magnetic tape cartridge 10 is shown partially inserted into a magnetic tape playback unit 12. A cross-sectional view of the cartridge as inserted in the playback unit is shown in FIG. 2. As can be seen in FIGS. 1 and 2, the cartridge 10 includes a top wall 14, bottom wall 16, sidewalls 18 and 20, front wall 22 and back wall 24. The front wall 22 of the cartridge 10 includes three openings 26, 28 and 30. The openings are designed to correspond in position to operative elements in the playback unit 12. For example, the playback unit 12 includes operative elements such as dual capstans 32 and 34 and magnetic reproducing head 36, all of which cooperate with the cartridge 10. Specifically, the magnetic reproducing head 36 fits within the opening 28, the capstan 32 fits within the opening 26 and the capstan 34 fits within the opening 30.

The playback unit 12 also includes master switch 38 which is operated by the front wall 22 of the cartridge 10 and which switch 38 controls the application of electrical power to the playback unit 12. The sidewall 20 of the cartridge 10 also includes a V-shaped slot 40. The slot 40 is similar in configuration to the slot which exists in the standard eight-track cartridges currently on the market. In applicant's cartridge the slot 40 is not used for locking but is used as a means of controlling the actuation of a switch 42. The switch 42 includes a spring-loaded control arm 44 having a roller member 46 at the end.

Figure 3:
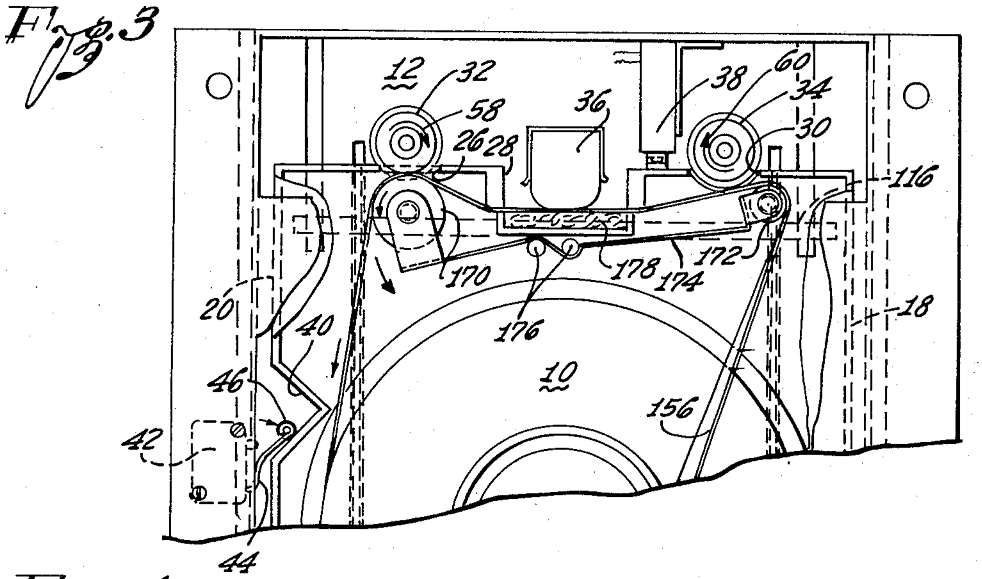
FIG. 3 illustrates the magnetic tape cartridge of the present invention in an operative position within the playback unit and wherein the cartridge has been inserted in a first orientation.

As the cartridge 10 is inserted in the playback unit 12, the sidewall 20 engages the roller 46 and pushes the arm 44 back. As can be seen in FIG. 3, when the cartridge is inserted in the playback unit with the orientation shown in FIGS. 1 and 3, the slot 40 receives the arm 44 and roller 46. Therefore, upon the insertion of the cartridge with the orientation shown in FIGS. 1 and 3, the switch 42 is actuated in a first particular direction. The actuation of the switch 42 controls the application of electrical energy to a motor 48 so as to control the direction of rotation of the motor 48. The motor 48 is coupled to the capstans 32 and 34 through belts 50 and 52 and the belts 50 and 52 go around pulleys 54 and 56 so as to provide for the proper speed of rotation of the capstans 32 and 34. Therefore, when a cartridge is inserted having the orientation as shown in FIGS. 1 and 3, the switch 42 is actuated in the first particular direction so as to rotate the capstans 32 and 34 in the direction as shown by the arrows 58 and 60. As can be seen, the arrows 58 and 60 are in a clockwise direction so that the magnetic tape within the cartridge 10 is moved in the proper direction.

Figure 4:
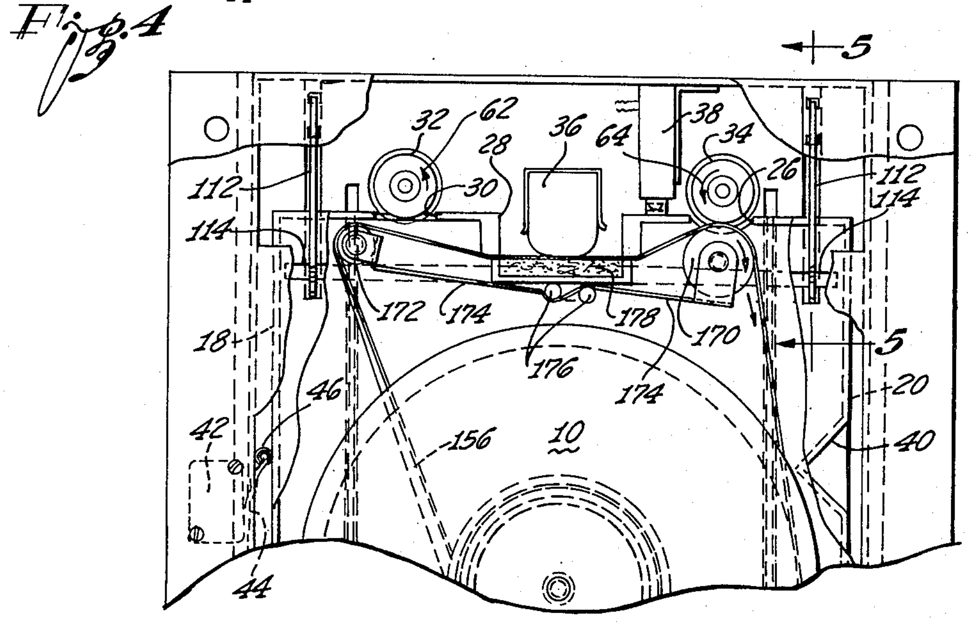
FIG. 4 illustrates the magnetic tape cartridge of the present invention in an operative position within the playback unit and wherein the cartridge has been inserted in a second orientation.

When the cartridge 12 is inserted with an orientation as shown in FIG. 4, the slot 40 is now on the righthand side, since the cartridge 12 is upside down relative to the orientation of the cartridge shown in FIGS. 1 and 3. The sidewall 18, therefore, engages the roller 46 and maintains the switch 42 in a second particular direction. The motor 48 shown in FIG. 1, therefore, is actuated to rotate in an opposite direction so that the capstans 32 and 34 are rotated in the counter-clockwise direction as shown by the arrows 62 and 64. The slot 40, in combination with the switch 42, acts as a sensing means to provide for the proper rotation of the capstans in accordance with the orientation of the cartridge 10 in the playback unit 12. In addition, the slot 40 may be used in a normal eight-track playback unit to provide locking of the cartridge.

In order to insure that the cartridge 10 is properly inserted into the playback unit 12, the cartridge includes rib members 100 on both the top wall 14 and bottom wall 16. The rib members 100 cooperate with slots 102 in the walls of the playback unit. The playback unit 12 may also receive a smaller cartridge 104 which is shown in dotted lines. The smaller cartridge 104, which would have a shorter playing time, would include ribs which would correspond in position to two of the ribs 100 on cartridge 10, but the overall width of the cartridge 104 would be smaller. The cartridge 104 would be inserted so that the ribs would enter into the slots 102 to properly position the cartridge. It is to be appreciated that the ribs 100 and slots 102 may be varied in number and position.

Figure 5:
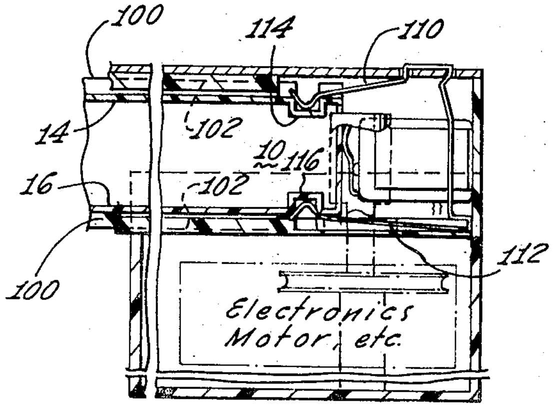
FIG. 5 is a cross-sectional view of the magnetic tape cartridge inserted into the playback unit taken along the line 5—5 of FIG. 4 and illustrating the locking of the cartridge into position.
Figure 6:
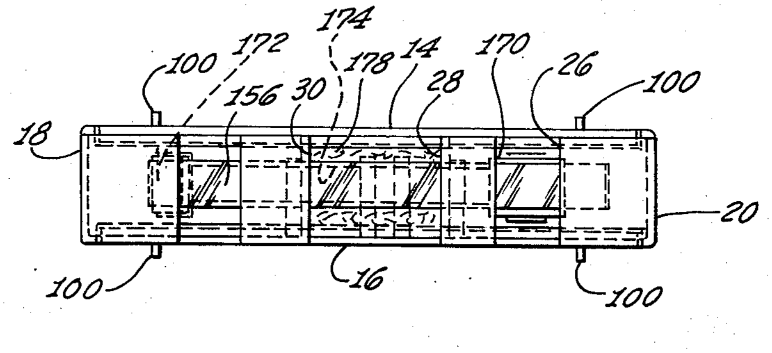
FIG. 6 is a front view of the magnetic tape cartridge of the present invention taken along line 6—6 of FIG. 1.

The cartridge 10 is locked in position using spring members 110 and 112 shown in FIG. 5. The spring members 110 and 112 cooperate with openings 114 and 116 in the top and bottom walls 14 and 16 of the cartridge 10. The eight-track cartridges currently in use already have a cutaway portion in one wall and this cutaway portion would be sufficient to allow for the locking of the eight-track cartridge currently in use in the playback unit of the present invention.

The internal construction of the tape cartridge 10 includes a reel member 150 which has a center tapered hub 152 and a support shelf 154. A magnetic tape 156 is supported on the support shelf 154 and emerges from the center adjacent to the tapered inside hub 152. The reel 150 also includes a center area 156 which rotates around a bearing 160. The bearing 160 is supported between the top and bottom walls 14 and 16 of the cartridge 10. As the magnetic tape 156 is pulled from the center of the reel 150, the magnetic tape passes across the front face 22 and then returns to the outside of the reel 150. The reel rotates around the center bearing 160 and is supported on a resilient slippery O-ring 162. The resilient 0-ring 162 maintains a constant force on the reel to insure that the tape 156 is forced in an upward direction as shown in FIG. 2.

The 0-ring is retained within a well 164 in the bottom wall 16. In addition, the tape 156 is supported by ribs 166 which are carried by the upper wall 14. The ribs 166 may be seen in more detail in FIG. 8 which is a showing of the internal construction of the top plate 14 of the cartridge 10. It can be seen that four ribs 166 extend around the top plate 14 to provide for a good support of the tape 156. The ribs 166 may be composed of a low-friction material. This allows for the replay of the cartridge both in the position shown in FIG. 1 and in the position shown in FIG. 4. When the cartridge is replayed in the position shown in FIG. 1, the magnetic tape 156 rides on the shelf 154 and slides against the ribs 166. The ribs 166 also prevent the magnetic tape 156 from creeping up to cause uneven tensions in the tape. When the cartridge 10 is turned upside down, as shown in FIG. 4, the magnetic tape 156 then rides on the ribs 166 with the shelf 154 and 0-ring 162 preventing the tape from creeping up. The 0-ring 162 provides sufficient force to maintain the tape 156 against the ribs 166. The top wall 14 also includes circular rib members 168 to contain the magnetic tape 156 and prevent the tape from spilling out.

The magnetic tape cartridge 10 also includes a pinch roller 170 and an idler roller 172 both mounted at the opposite ends of a leaf spring 174. The use of this spring mounting for the pinch roller 170 and the idler roller 172 allows the pinch roller and idler wheel to absorb many shocks and vibrations in the playback unit thereby reducing the amount of wow and flutter during the playback of the information on the magnetic tape 156. The leaf spring 174 is held in position using a slide-in mounting and including a pair of pins 176. The magnetic tape 156, as it passes across the center opening 28, is backed by resilient material 178 such as resilient foam so that the magnetic head 36 is maintained in good contact with the magnetic tape 156. As can be seen in FIG. 3, when the cartridge 10 is inserted into the playback unit, the pinch roller 170 is deflected by the capstan 32, thereby assuring good pressure between the pinch roller 170 and the capstan 32. In the orientation of the magnetic tape cartridge 10 shown in FIG. 4, the pinch roller 170 is again deflected, this time by the capstan 34. Since the direction of rotation of the capstans is changed, the magnetic tape 156 is moved in an opposite direction relative to the magnetic head 36, but the direction of the magnetic tape 156 within the cartridge is always the same so that the magnetic tape is pulled out of the center of the reel 150 and deposited on the outisde of the reel.

Figure 7:
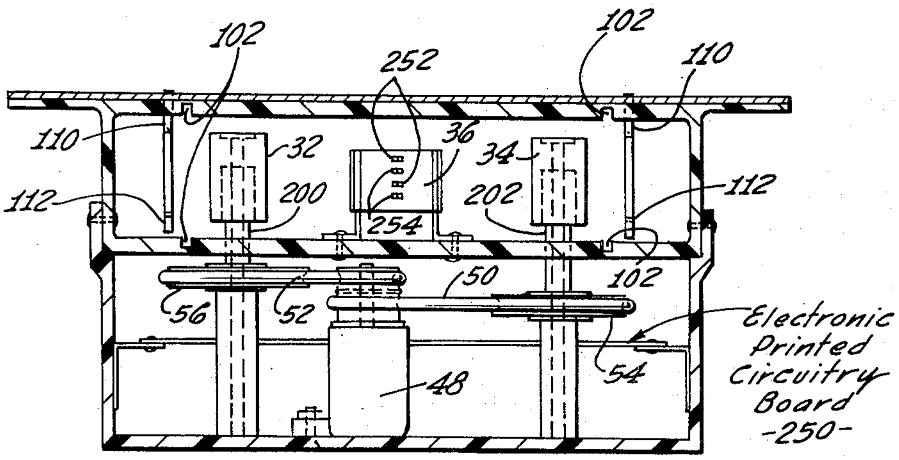
FIG. 7 is a cross-sectional view of the playback unit of the present invention taken along line 7—7 of FIG. 1.
Figure 7:
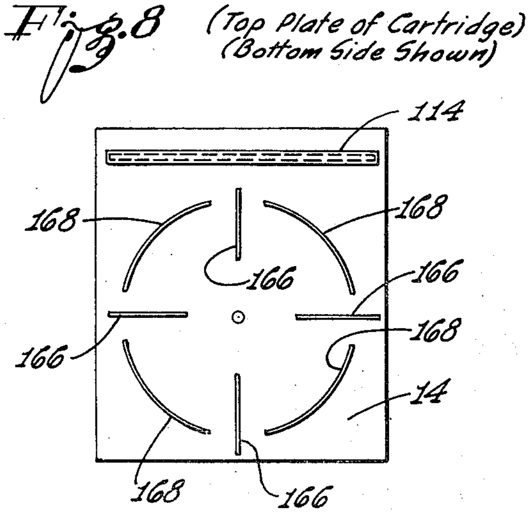

FIG. 7 shows the internal structure of the playback unit and illustrates the structure of capstans 32 and 34. As can be seen in FIG. 7, the capstans 32 and 34 each have a cutout shaft portion 200 and 202. The cutout portion allows the capstans to be used with cartridges wherein the opening in the front of the cartridge does not extend through the top and bottom walls. For example, the eight-track cartridges currently on the market have openings in the front face corresponding in position to the openings 26 and 30 but one of the openings is only through the front face and not through the top and bottom walls. The cutout portions of the capstans at the positions 200 and 202 allow the particular capstan to enter into the opening between the top and bottom walls, thereby providing for the replay of the prior art eight-track tape cartridges.

In FIG. 7, a printed circuit board 250 is shown which would contain the necessary electronics for the playback unit. It is to be appreciated, however, that the particular type of electronics and speakers used with the playback unit are conventional and form no part of the present invention. The present invention, therefore, is directed to a magnetic tape cartridge and playback unit which are compatible with existing cartridges and playback units in existence but which also allow for a simpler operation than existing cartridges and playback units.

The cartridge and playback unit of the present invention are designed to be replayed in a similar manner to conventional reel-to-reel magnetic tapes so that the cartridge may be inserted in a first orientation for the replay of one-half of the information and then turned over in a second orientation for the replay of the remaining one-half of the information. This turning over simplifies the design of the magnetic reproducing head so as to allow for a simpler structure than is currently used in playback units. For example, as shown in FIG. 7, the playback head 36 is shown to include two pairs of air gaps 252 and 254. These air gaps 252 and 254 are offset so that when the magnetic tape is first inserted, the air gaps replay half of the information and when the cartridge is turned over, the air gaps replay the remaining information. It is to be appreciated that a single set of air gaps may be used and the head may be moved to a second position to replay the second set of tracks. The cartridge may then be turned over for replay of the remaining information.

The system of the present invention also includes other inventive aspects in the manner of locking the cartridge in position and of positioning the cartridge through the use of ribs on the cartridge and slots in the playback unit. This allows for the replay of small cartridges in addition to the normal size cartridges. The cartridge also includes a spring-loaded pinch roller and idler wheel mounted at opposite ends of a leaf spring to absorb shock and vibration and lower wow and flutter in the system. The spring-loading of the pinch roller and idler wheel also tends to equalize tension in the magnetic tape.

Although the system has been described and illustrated with reference to a particular embodiment, it is to be appreciated that adaptations and modifications may be made and that the invention is only to be limited by the appended claims.

I claim:

1. A single-reel endless-belt magnetic tape cartridge for use with a playback unit having a magnetic playback head and a pair of spaced capstans and which includes a spring-loaded switch having first and second states of operation to control the direction of operation of the dual capstans in accordance with the state of operation of the switch including an outer housing including a front face, top and bottom walls and side walls, a single reel of magnetic tape located between the top and bottom walls and including a loop of tape passing across the front face, at least three open areas in the front face to expose the loop of tape and with a first open area located in a central position to receive the magnetic playback head and with the second and third open areas located to each side of the first open area to receive the dual capstans, a pinch roller located between the top and bottom walls and adjacent to the second open area to support the loop of the magnetic tape for movement by either of the dual capstans in accordance with the orientation of the tape cartridge in the playback unit, and the housing of the tape cartridge includes a portion for controlling the state of operation of the switch and with the switch in a first state for a first orientation of the tape cartridge in the playback unit and with the switch in a second state for a second orientation of the tape cartridge in the playback unit to control the capstans in accordance with the orientation of the tape cartridge in the playback unit.

2. The magnetic tape cartridge of claim 1 additionally including means for spring-loading the pinch roller in a direction toward the spaced capstans.

3. The magnetic tape cartridge of claim 1 wherein the playback unit includes spring-loaded locking members and wherein the housing includes locking slots in the top and bottom walls to receive the locking members.

4. The magnetic tape cartridge of claim 1 wherein the housing includes rib members which cooperate with slots in the playback unit so as to replay varying sizes of cartridges.

5. The magnetic tape cartridge of claim 1 additionally including a resilient O-ring located between the bottom wall and the reel of magnetic tape to force the reel of magnetic tape toward the top wall.

6. A single-reel endless-belt magnetic tape cartridge for use with a playback unit having a magnetic playback head and a capstan, including an outer housing including a front face, top and bottom walls and side walls, a single reel of magnetic tape located between the top and bottom walls and including a loop of tape passing across the front face, at least two open areas in the front face to expose the loop of tape and with a first open area located in a central position to receive the magnetic playback head and with the second open area located to the side of the first open area to receive the capstan, a pinch roller located between the top and bottom walls and adjacent to the second open area to support the magnetic tape for movement by the capstan, an idler roller located between the top and bottom walls to support the magnetic tape during movement, and unitary resilient means for supporting the pinch roller and idler roller.

7. The magnetic tape cartridge of claim 6 wherein the unitary resilient means is a leaf spring fixedly mounted at a central position and supporting the pinch roller and idler roller of the end positions.

8. A single-reel endless belt magnetic tape cartridge for use with a playback unit having a magnetic playback head, a pair of spaced capstans and a directional switching means to individually control the spaced capstans, including an outer housing including a front face, top and bottom walls and side walls, a single reel of magnetic tape located between the top and bottom walls and including a loop of tape passing across the front face, at least three open areas in the front face to expose the loop of tape and with a first open area located in a central position to receive the magnetic playback head and with the second and third open areas located to each side of the first open area to receive the dual capstans, a pinch roller located between the top and bottom walls and adjacent to the second open area to support the loop of the magnetic tape for movement by either of the dual capstans in accordance with the orientation of the tape cartridge in the playback unit, and means located on the outer housing to activate the directional switching means in accordance with the orientation of the tape cartridge.

9. The magnetic tape cartridge of claim 8 wherein the last-mentioned means is a slot on one side wall of the housing.

* * * * *